United States Patent [19]

Shimokawa et al.

[11] Patent Number: 5,456,898

[45] Date of Patent: Oct. 10, 1995

[54] METHOD FOR ENRICHMENT AND PURIFICATION OF AQUEOUS HYDROGEN PEROXIDE SOLUTION

[75] Inventors: Shigeki Shimokawa; Yoshitsugu Minamikawa; Seishi Murakami, all of Yokkaichi, Japan

[73] Assignee: Mitsubishi Gas Chemical Co., Inc., Japan

[21] Appl. No.: 303,834

[22] Filed: Sep. 9, 1994

[30] Foreign Application Priority Data

Sep. 13, 1993 [JP] Japan .................. 5-227272

[51] Int. Cl.[6] .................. C01B 15/01
[52] U.S. Cl. .................. 423/584; 203/40; 203/41
[58] Field of Search .............. 423/584; 203/40, 203/41

[56] References Cited

U.S. PATENT DOCUMENTS

| | | | |
|---|---|---|---|
| 2,919,975 | 1/1960 | Moore | 203/41 |
| 2,990,341 | 6/1961 | Graybill | 203/40 |
| 3,073,775 | 1/1963 | Banfield et al. | |
| 3,205,934 | 9/1965 | Vincent et al. | 203/40 |
| 5,055,286 | 10/1991 | Watanabe et al. | 423/584 |
| 5,232,680 | 8/1993 | Honig et al. | 423/584 |

FOREIGN PATENT DOCUMENTS

| | | | |
|---|---|---|---|
| 366417 | 2/1932 | Japan | 203/40 |
| 378256 | 3/1960 | Japan . | |
| 45-34926 | 11/1970 | Japan . | |
| 1326282 | 8/1973 | United Kingdom . | |

Primary Examiner—Wayne Langel
Attorney, Agent, or Firm—Wenderoth, Lind & Ponack

[57] ABSTRACT

Proposed is an improvement in a method for the preparation of an enriched and purified aqueous hydrogen peroxide solution from a crude aqueous hydrogen peroxide solution comprising the steps of evaporating the crude aqueous hydrogen peroxide solution in an evaporator into vapor with accompanying liquid in the form of a mist, separating the vapor from the mist of liquid in a gas-liquid separator and subjecting the vapor to fractionating distillation in a fractionating distillation column in order to greatly upgrade the product solution relative to the impurity content. The improvement is achieved by subjecting the crude aqueous hydrogen peroxide solution, prior to introduction into the evaporator, to a contacting treatment with a porous synthetic adsorbent resin to remove organic impurities from the crude aqueous hydrogen peroxide solution to such an extent that the crude aqueous hydrogen peroxide solution after the contacting treatment contains organic impurities in an amount not exceeding 50 ppm by weight calculated as organic carbon. Although the mechanism is not well understood, the preliminary removal of organic impurities from the crude aqueous hydrogen peroxide solution has an effect of greatly increasing the efficiency of gas-liquid separation of the vapor accompanied by a mist of liquid in the gas-liquid separator to decrease the amount of contaminant impurities introduced into the distillation column as carried by the mist.

6 Claims, 2 Drawing Sheets

METHOD FOR ENRICHMENT AND PURIFICATION OF AQUEOUS HYDROGEN PEROXIDE SOLUTION

BACKGROUND OF THE INVENTION

The present invention relates to a method for the enrichment and purification of an aqueous solution of hydrogen peroxide. More particularly, the invention relates to an improvement in the method for the enrichment and purification of an aqueous solution of hydrogen peroxide in which a crude aqueous solution of hydrogen peroxide obtained, for example, by the anthraquinone method is subjected to evaporation in an evaporator into vapor and an accompanying liquid, the vapor is separated from the accompanying liquid in a gas-liquid separator and the vapor freed from the accompanying liquid is introduced into a fractionating distillation column to be enriched there into a high-purity enriched aqueous solution of hydrogen peroxide suitable for use in electronic industries or as a base solution of a super-high purity hydrogen peroxide solution required in the manufacture of semiconductor devices as well as for a reagent in a wide variety of chemical reactions.

As is known, hydrogen peroxide is produced currently by the so-called anthraquinone method involving the reaction of autoxidation of anthraquinone. In the anthraquinone method, namely, a 2-alkyl anthraquinone is hydrogenated in a water-insoluble organic solvent in the presence of a hydrogenation catalyst to give a corresponding anthrahydroquinone compound which is, after being freed from the catalyst by filtration, oxidized with oxygen or air to regenerate the starting anthraquinone compound with concurrent formation of hydrogen peroxide which is extracted with water to give an aqueous solution of hydrogen peroxide. The thus obtained aqueous solution of hydrogen peroxide contains considerable amounts of organic materials as impurities including the anthraquinone compounds and organic solvents as well as degradation products thereof so that it is a usual practice that the organic impurities in the aqueous hydrogen peroxide solution are removed by extraction with a water-immiscible organic solvent to give a primarily purified aqueous solution of hydrogen peroxide, referred to as a crude hydrogen peroxide solution hereinafter, containing decreased amounts of organic impurities. The content of hydrogen peroxide in a crude hydrogen peroxide solution is usually in the range from 15 to 40% by weight so that the solution in most cases must be enriched relative to the content of hydrogen peroxide, even by setting aside the problem relative to the content of impurities, since the aqueous hydrogen peroxide solution industrially required should have a content of hydrogen peroxide in the range from 30 to 70% by weight.

Various processes have been proposed as a method for the enrichment and purification of a crude hydrogen peroxide solution in U.S. Pat. No. 3,073,755, British Patent 1,326,282, Japanese Patent Publication 37-8256, Japanese Patent Publication 45-34926 and elsewhere. Each of these prior art processes utilizes, in principle, an apparatus system in which the crude hydrogen peroxide solution is evaporated in an evaporator into vapor with an accompanying liquid in the form of a mist which is separated and removed from the vapor in a gas-liquid separator and the vapor freed from the mist of liquid is introduced into a fractionating distillation column in which fractionating distillation is performed to give an enriched and purified aqueous hydrogen peroxide solution.

The aqueous hydrogen peroxide solution obtained by the above described prior art process can be used in most applications not only as a reagent for various chemical reactions but also as a bleaching agent, chemical polishing agent and the like. As a trend in recent years, the demand for aqueous hydrogen peroxide solutions is increasing year by year in the field of electronic industries including the manufacture of semiconductor devices and printed circuit boards. When an aqueous hydrogen peroxide solution is to be used in these applications in the electronic industries, it is essential that the aqueous hydrogen peroxide solution must have an extremely high purity relative to organic and inorganic impurities and the aqueous hydrogen peroxide solution prepared by the above described conventional process for the enrichment and purification of a crude hydrogen peroxide solution is not always satisfactory in this regard.

Namely, the above described conventional enrichment and purification processes of aqueous hydrogen peroxide solutions involve several problems when a high-quality aqueous hydrogen peroxide solution suitable for use in the electronic industries is desired. The crude hydrogen peroxide solution usually contains, besides organic impurities in a very low but non-negligible concentration, inorganic impurities originating in the surfaces of the apparatuses, pipe lines and the like. In addition, it is sometimes the case that the crude hydrogen peroxide solution contains stabilizers added to the reaction mixture in the manufacturing process with an object to prevent decomposition of hydrogen peroxide. Although these organic and inorganic impurities are not vaporizable, the vapor coming from the gas-liquid separator and introduced into the fractionating distillation column sometimes contains these impurities in the form of a mist of liquid accompanying the vapor due to incomplete gas-liquid separation in the gas-liquid separator so that the enriched and purified aqueous hydrogen peroxide solution obtained from the fractionating distillation column is necessarily contaminated with these impurities. Needless to say, various proposals and attempts have been made heretofore in order to improve the efficiency of the gas-liquid separation process using gas-liquid separators working on various principles including so-called demisters and the like.

Notwithstanding the proposals and attempts made heretofore, it is an extremely difficult matter to achieve perfect removal of the accompanying liquid in the form of extremely fine mist particles from the vapor produced from the crude hydrogen peroxide solution in an evaporator because the contacting surface area for the vapor in the gas-liquid separator cannot be large enough in consideration of the instability of hydrogen peroxide when contacted with the contacting surface of the gas-liquid separator. Despite the above mentioned problems relative to the efficiency of gas-liquid separation, no satisfactory process of gas-liquid separation and types or structures of gas-liquid separators as well as operating conditions thereof have yet been developed in order to meet the requirement for the purity of an enriched and purified aqueous hydrogen peroxide solution suitable for use in electronic industries.

SUMMARY OF THE INVENTION

The present invention accordingly has an object to provide a means for the preparation of a high-purity enriched aqueous solution of hydrogen peroxide suitable for use even in the electronic industries from a crude hydrogen peroxide solution in view of the above described problems due to the incomplete gas-liquid separation in a gas-liquid separator into which the vapor, together with accompanying liquid in the form of a mist, produced by evaporating a crude hydrogen peroxide solution in an evaporator is introduced to cause contamination of the enriched and purified aqueous hydrogen peroxide solution obtained from the bottom of a fractionating distillation column.

Thus, the present invention provides, in a method for the preparation of an enriched and purified aqueous hydrogen peroxide solution from a crude aqueous hydrogen peroxide solution comprising the steps of evaporating the crude aqueous hydrogen peroxide solution in an evaporator into vapor with accompanying liquid in the form of a mist, separating the vapor from the mist of liquid in a gas-liquid separator and subjecting the vapor freed from the mist of liquid to fractionating distillation in a fractionating distillation column, the improvement which comprises subjecting the crude aqueous hydrogen peroxide solution, prior to introduction into the evaporator, to a contacting treatment with a porous synthetic adsorbent resin to remove organic impurities from the crude aqueous hydrogen peroxide solution to such an extent that the solution after the contacting treatment with the adsorbent resin contains organic impurities in an amount not exceeding 50 ppm by weight calculated as organic carbon.

DETAILED DESCRIPTION OF THE PREFERRED EMBODIMENTS

Figure 1:
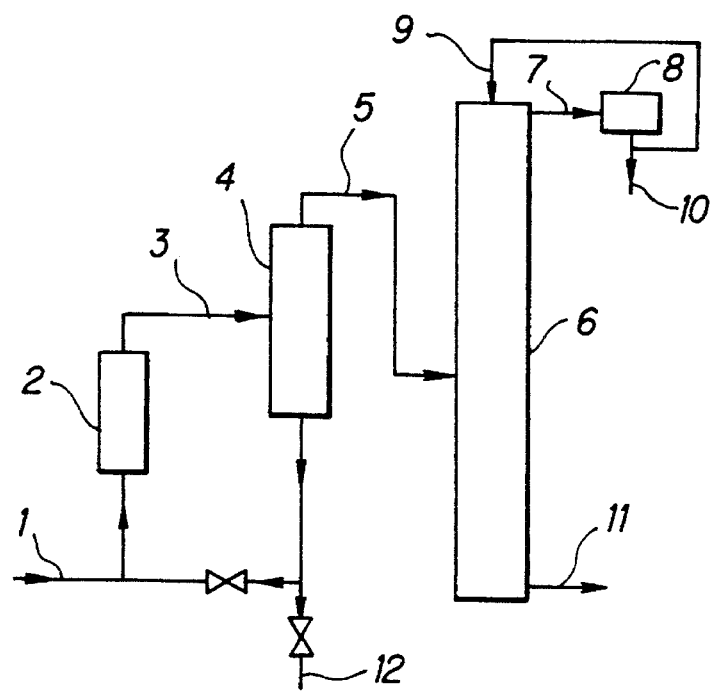
FIG. 1 is a flow diagram of a conventional apparatus system for the enrichment and purification of a crude aqueous hydrogen peroxide solution.

As is described above, the most characteristic feature of the process according to the present invention consists in the specific pre-treatment of the crude aqueous hydrogen peroxide solution prior to introduction into an evaporator, the rest of the process being substantially the same as in the conventional process utilizing the apparatus system of the flow diagram illustrated in FIG. 1. In this conventional flow diagram, the crude aqueous solution of hydrogen peroxide obtained by the anthraquinone method is, through the pipe line 1, introduced into the evaporator 2 and evaporated there into vapor which is, together with the accompanying liquid in the form of a mist, introduced, through the pipe line 3, into the gas-liquid separator 4. The vapor consisting of hydrogen peroxide, water vapor and volatile impurities is freed in the gas-liquid separator 4 from most of the accompanying liquid in the form of a mist consisting of an aqueous hydrogen peroxide solution in equilibrium with the vapor phase and containing non-volatile impurities. While the accompanying liquid separated from the vapor in the gas-liquid separator 4 is recycled to the evaporator 2 though partly discharged through the pipe line 12 in order to prevent accumulation of non-volatile impurities, the vapor coming out of the gas-liquid separator 4 is, through the pipe line 5, introduced into the fractionating distillation column 6 at the middle height. In the distillation column 6, the hydrogen peroxide concentration in the vapor ascending in the column 6 is gradually decreased by contacting with the refluxing water introduced to the column top from the pipe line 9 and the vapor coming out of the top of the distillation column 6 and containing almost no hydrogen peroxide is introduced, through the pipe line 7, into the condenser 8 where the water vapor is condensed into condensation water which is partly returned to the pipe line 9 as the refluxing water and partly discharged through the pipe line 10. On the other hand, the hydrogen peroxide concentration in the downflow liquid descending in the distillation column 6 is gradually increased and drawn out of the bottom of the column 6 through the pipe line 11 as an enriched and purified aqueous hydrogen peroxide solution. The evaporation of the crude solution, gas-liquid separation and fractionating distillation are carried out usually under reduced pressure.

Since it is usual that the enriched and purified aqueous hydrogen peroxide solution obtained in the above described process is not quite satisfactory in respect of the purity presumably due to incompleteness relative to the efficiency of gas-liquid separation in the gas-liquid separator 4, the inventors have conducted extensive investigations to solve the problem and have arrived at an unexpected discovery that the efficiency of gas-liquid separation greatly depends on the content of impurities or, in particular, organic impurities contained in the crude hydrogen peroxide solution as a feed to the evaporator 2 so that the efficiency of gas-liquid separation can be greatly different even in gas-liquid separators of the same type when the contents of organic impurities differ in the crude hydrogen peroxide solutions introduced into the evaporator. In other words, a good efficiency of gas-liquid separation in the gas-liquid separator can be achieved only when the content of organic impurities in the crude hydrogen peroxide solution introduced into the evaporator is decreased to a certain level lower than, for example, 50 ppm by weight calculated as organic carbon. Accordingly, the inventors have further continued their investigations with an object to discover a method for efficiently removing the organic impurities leading to establishment of the present invention according to which the crude hydrogen peroxide solution prior to introduction into the evaporator is subjected to a pre-treatment by contacting with a porous adsorbent resin.

Figure 2:
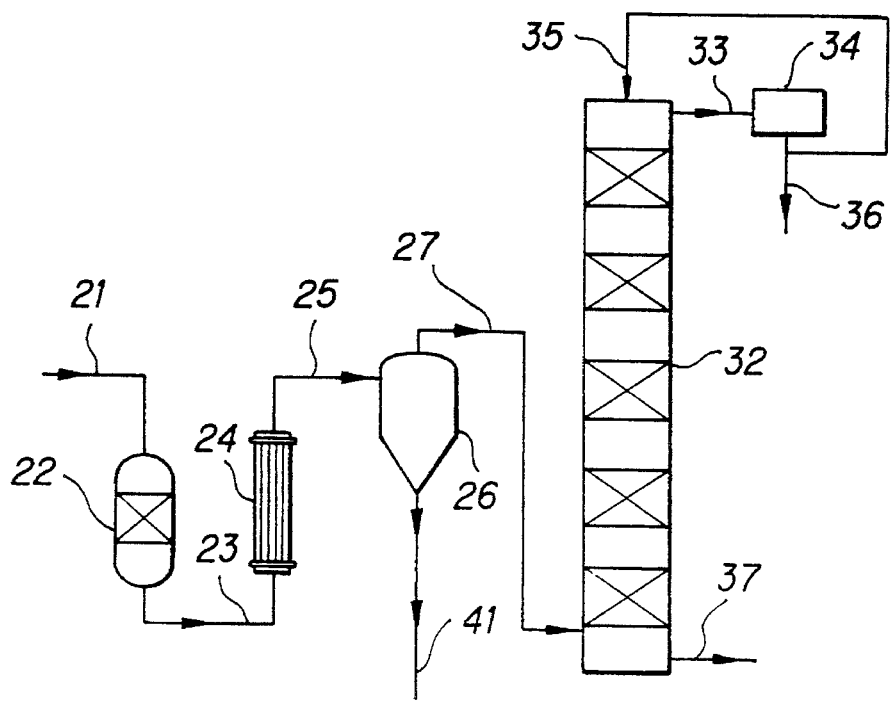
FIG. 2 is a flow diagram of an apparatus system for the enrichment and purification of a crude aqueous hydrogen peroxide solution according to the improvement of the present invention.

The process according to the present invention for the enrichment and purification of a crude hydrogen peroxide solution is described in the following by making reference to FIG. 2 illustrating the flow diagram of the process according to the invention. The crude hydrogen peroxide solution is introduced, through the pipe line 21, into the adsorbent resin column 22 filled with beads of a porous adsorbent resin and freed from the organic impurities by contacting with the resin. The solution is then introduced, through the pipe line 23, into the evaporator 24 where the solution is evaporated to produce vapor consisting of hydrogen peroxide, water vapor and volatile organic impurities accompanied by a mist of liquid in equilibrium with the vapor phase and containing non-volatile impurities. The vapor accompanied by the mist of liquid is introduced, through the pipe line 25, into the gas-liquid separator 26 in which the vapor is freed quite efficiently from the mist of liquid. The liquid fraction collected in the gas-liquid separator 26 is discharged out of the line 41 as an aqueous hydrogen peroxide solution and the vapor freed from the liquid fraction is introduced, through the pipe line 27, into the fractionating distillation column 32, preferably, at the column bottom or at a height near to the bottom, in which the hydrogen peroxide concentration in the ascending vapor is gradually decreased by countercurrently contacting with the refluxing water supplied to the column top through the line 35 and the hydrogen peroxide concentration in the downflow liquid is gradually increased so that an enriched and purified aqueous hydrogen peroxide solution is drawn out of the column bottom through the line 37. The vapor discharged out of the top of the distillation column 32 is led through the pipe line 33 into the condenser 34 where it is condensed into condensation water containing substantially no hydrogen peroxide which is partly discarded through the line 36 and partly returned to the top of the distillation column 32 as the refluxing water. It is of course that the condensation water as a whole is discarded and, instead, freshly deionized water is used as the refluxing water. The high-purity enriched hydrogen peroxide solution drawn out of the bottom of the distillation column 32 through the line 37 is stored in a tank (not shown in the figure) for transportation and shipping.

The porous adsorbent resin filling the adsorbent resin column 22 to be contacted therein with the crude hydrogen peroxide solution is typically a crosslinked copolymeric resin of styrene and divinyl benzene. Several grades of such an adsorbent resin in the form of beads are available on the market under the trade names of, for example, Amberlites XAD-1, XAD-2, XAD-4 and XAD-16 (each a product by Rohm & Haas Co.), Sepabeads SP207 and SP825 (each a product by Mitsubishi Chemical Industry Co.) and the like. Copolymeric resins of a chlorinated or brominated styrene and divinyl benzene are also suitable. It is a convenient way that the crude hydrogen peroxide solution is passed through a column filled with the adsorbent resin to effect efficient contacting of the solution and the resin. The temperature of the crude hydrogen peroxide solution in this contacting treatment can be in the range from 0° to 40° C. When the solution is passed through a resin-filled column, the space velocity should be in the range from about 1 to about 50 per hour or, preferably, from 5 to 30 per hour. While a crude hydrogen peroxide solution usually contains 100 to 200 ppm by weight of non-volatile organic impurities calculated as total organic carbon (TOC), it is possible to decrease the content of TOC in the solution to 50 ppm or less or, preferably, 40 ppm or less when the resin-contacting treatment is undertaken adequately.

The rate of evaporation of the crude hydrogen peroxide solution after the above described adsorption treatment in the evaporator is preferably such that, taking the amount of pure hydrogen peroxide contained in the solution introduced into the evaporator as 100, the enriched hydrogen peroxide solution separated in the gas-liquid separator and discharged therefrom contains from 40 to 75 of net hydrogen peroxide. The process of evaporation of the crude solution in the evaporator is performed under a pressure in the range from 50 Torr to 200 Torr or, preferably, from 60 Torr to 150 Torr and the evaporator is operated such that the temperature of the vapor at the exit of the evaporator or, namely, at the inlet to the gas-liquid separator is in the range from 40° C. to 90° C. or, preferably, from 60° C. to 80° C.

Figure 3:
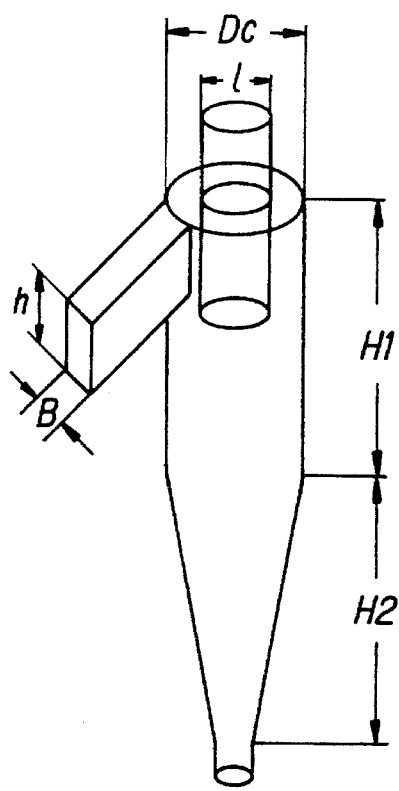
FIG. 3 is a schematic perspective illustration of a cyclone.

The type of the gas-liquid separator is not particularly limitative but cyclones and so-called mist separators can be used satisfactorily. The cyclone can be an ordinary cyclone with tangential inlet or a cyclone of the sirocco type, of which the standard cyclones of the former type illustrated in FIG. 3 are preferred. The dimensional ratios of the standard cyclone can be non-limitatively selected according to the teaching in Chemical Engineering Handbook or Perry's Chemical Engineers' Handbook, sixth ed., pages 20–84 and FIGS. 20–106. Denoting the diameter of the cyclone as Dc, preferable ranges of the dimensions shown in FIG. 3 include: B=⅕·Dc to ¼·Dc; h=½·Dc; l=½·Dc to ⅖·Dc; H1=Dc to 2·Dc; and H2=2·Dc. Good performance of the cyclone can be ensured when the diameter of the cyclone Dc is selected in such a way that the velocity of the vapor stream at the inlet to the cyclone is in the range from 10 meters/second to 150 meters/second or, preferably, from 20 meters/second to 100 meters/second under the above described running conditions of the evaporator relative to the temperature and pressure. The material of the cyclone can be stainless steel or aluminum but aluminum or an aluminum-based alloy is preferred because stainless steel surfaces have a problem of possible promotion of decomposition of hydrogen peroxide coming into contact therewith.

Figure 4:
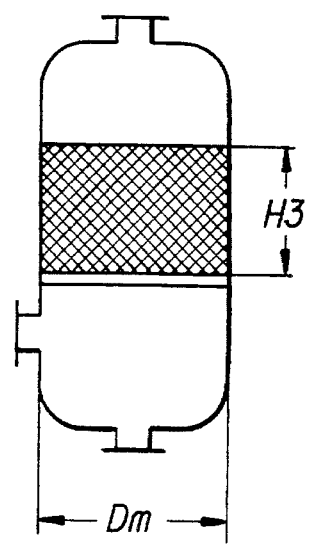
FIG. 4 is a schematic axial cross sectional view of a mist separator.

A gas-liquid separator of the above mentioned mist separator-type is illustrated in FIG. 4 by an axial cross sectional view. The working element of a mist separator has a structure obtained by stacking a large number of nets one on the other, of which the space ratio, i.e. the ratio of void space in the stack of the nets not occupied by the filaments or wires forming the nets divided by the bulk volume of the stack, is preferably in the range from 95 to 99% and the surface area, i.e. the overall surface area of the filaments or wires forming the nets per unit bulk volume of the stack of the nets, is preferably in the range from 150 to 1000 $m^2/m^3$. The stack of the nets preferably has a thickness H3 in the range from 100 mm to 1000 mm. Good efficiency of gas-liquid separation can be obtained when the diameter Dm of the mist separator is selected in such a way that the velocity of the vapor stream at the inlet to the mist separator is in the range from 1 meter/second to 50 meters/second or, preferably, from 5 meters/second to 25 meters/second under the above described running conditions of the evaporator relative to the temperature and pressure. Filaments of a fluorocarbon resin and aluminum wires can be used as the material of the nets forming the mist separator. Other metals are not preferable because of possible contamination of the hydrogen peroxide solution and eventual promotion of decomposition of hydrogen peroxide by contacting with the so large surface area of the nets forming the mist separator.

The structure and the operating conditions of the fractionating distillation column can be conventional. The refluxing water is introduced to the top of the distillation column at such a controlled rate, that the enriched and purified aqueous hydrogen peroxide solution drawn out of the bottom of the distillation column contains from 40% to 70% by weight of hydrogen peroxide.

Although no convincible explanation can be given here on the mechanism by which the efficiency in the gas-liquid separation in the gas-liquid separator is greatly influenced by the quality of or, in particular, content of organic impurities in the crude hydrogen peroxide solution introduced into the evaporator, it is presumable that this effect is correlated with the phenomenon that, when a crude hydrogen peroxide solution is vigorously agitated to cause foaming, a solution containing a larger amount of organic impurities causes more intense foaming. In other words, it would be a possible case that scattering of the liquid mist once deposited on the walls of the cyclones or on the nets of the mist separators is affected by the viscosity of the liquid or foaming behavior thereof.

As is understood from the above given description, the present invention provides a solution for the problem that the quality of an enriched and purified aqueous hydrogen peroxide solution obtained in a conventional apparatus system as illustrated in the flow diagram of FIG. 1 cannot be high enough presumably because of the low efficiency of gas-liquid separation in a gas-liquid separator allowing a considerable amount of the mist of liquid to accompany the vapor introduced into the fractionating distillation column resulting in an increase in the contents of organic and inorganic non-volatile impurities in the enriched and purified aqueous hydrogen peroxide solution drawn out of the distillation column.

In the following, examples and comparative examples are given to illustrate the improvement according to the present invention in more detail, although the scope of the present invention is never limited by these examples in any way.

EXAMPLE 1

An apparatus system for the enrichment and purification of a crude hydrogen peroxide solution was constructed according to the flow diagram illustrated in FIG. 2 including an adsorbent resin column having an inner diameter of 600 mm and a height of 1000 mm and filled with 250 liters of an adsorbent resin (Sepabeads SP207, supra), a standard cyclone, as a gas-liquid separator, of the type described in Perry's Chemical Engineers' Handbook, of which the dimensions Dc, B, h, 1, H1 and H2 shown in FIG. 3 were 1240 mm, 310 mm, 620 mm, 620 mm, 2480 mm and 2480 mm, respectively, and an aluminum-made fractionating distillation column having a column diameter of 1700 mm and filled with porcelain packings up to a height of 6000 mm.

A crude hydrogen peroxide solution, containing 32% by weight of hydrogen peroxide, 38 ppm by weight of evaporation residue, 90 ppm by weight of total organic carbon (TOC) and 3500 ppb of sodium as introduced mainly by the addition of 15 ppm by weight of sodium pyrophosphate decahydrate together with 20 ppm by weight of amino tri(methylene phosphonic acid) as the stabilizers for hydrogen peroxide, was continuously introduced into the adsorbent resin column at a constant rate of 5100 liters/hour. This feed rate corresponds to a space velocity of 20.4 per hour (based on the volume of the resin beads) in the adsorbent resin column.

When a stationary state of running was established with a temperature of 68° to 70° C. and a pressure of 90 to 100 Torr at the exit of the evaporator, feed rate of the refluxing water of about 1500 liters/hour and gas flow velocity of about 60 meters/second at the inlet to the cyclone as calculated from the material balance, an enriched hydrogen peroxide solution containing 64% by weight of hydrogen peroxide was obtained from the bottom of the cyclone at a rate of 1600 kg/hour and an enriched and purified solution containing 54% by weight of hydrogen peroxide was obtained from the bottom of the distillation column at a rate of 1400 kg/hour.

The enriched and purified hydrogen peroxide solution thus obtained contained 12 ppb by weight of sodium as an inorganic impurity as determined by the atomic absorption spectrophotometry and 4 ppm by weight of evaporation residue as determined by the procedure specified in JIS K 1463. The solution coming out of the adsorbent resin column contained 28 ppm by weight of TOC.

EXAMPLE 2

The procedure was substantially the same as in Example 1 except that the gas-liquid separator was a standard cyclone described in Perry's Chemical Engineers' Handbook having an inner diameter Dc of 960 mm. The gas flow velocity at the inlet to the cyclone was about 100 meters/second as calculated from the material balance.

The enriched and purified hydrogen peroxide solution obtained from the bottom of the fractionating distillation column contained 15 ppb by weight of sodium and 5 ppm by weight of evaporation residue.

Comparative Example 1

The procedure was substantially the same as in Example 1 except that the crude hydrogen peroxide solution was directly introduced into the evaporator without passing through the adsorbent resin column.

The enriched and purified hydrogen peroxide solution obtained from the bottom of the fractionating distillation column contained 75 ppb by weight of sodium and 11 ppm by weight of evaporation residue.

Comparative Example 2

The procedure was substantially the same as in Example 2 except that the crude hydrogen peroxide solution was directly introduced into the evaporator without passing through the adsorbent resin column.

The enriched and purified hydrogen peroxide solution obtained from the bottom of the fractionating distillation column contained 110 ppb by weight of sodium and 15 ppm by weight of evaporation residue.

EXAMPLE 3

The procedure was about the same as in Example 1 except that the adsorbent resin column was filled with 250 liters of another adsorbent resin (Amberlite XAD-2, supra) and the cyclone as the gas-liquid separator was replaced with a mist separator of which the mist-separating element was a 250 mm high multilayered stack of nets made of filaments of a fluorocarbon resin (Aflon, a product by Asahi Glass Co.) having a space ratio of 98% and a surface area of 380 $m^2/m^3$. When a stationary state was established with a temperature of 68° to 70° C. and a pressure of 90 to 100 Torr at the exit of the evaporator and a feed rate of the refluxing water of about 1500 liters/hour, an enriched hydrogen peroxide solution containing 64% by weight of hydrogen peroxide was drawn out from the bottom of the mist separator at a rate of 1600 kg/hour and an enriched and purified hydrogen peroxide solution containing 54% by weight of hydrogen peroxide was obtained from the bottom of the fractionating distillation column at a rate of 1400 kg/hour. The gas flow velocity at the inlet to the mist separator was about 7 meters/second as calculated from the material balance. The solution coming out of the adsorbent resin column contained 35 ppm by weight of TOC.

The enriched and purified hydrogen peroxide solution obtained from the bottom of the fractionating distillation column contained less than 10 ppb by weight of sodium and 3 ppm by weight of evaporation residue.

Comparative Example 3

The procedure was substantially the same as in Example 3 except that the crude hydrogen peroxide solution was directly introduced into the evaporator without passing through the adsorbent resin column.

The enriched and purified hydrogen peroxide solution obtained from the bottom of the fractionating distillation column contained 95 ppb by weight of sodium and 14 ppm by weight of evaporation residue.

Comparative Example 4

The procedure was substantially the same as in Example 3 except that the crude hydrogen peroxide solution was directly introduced into the evaporator without passing through the adsorbent resin column and the height of the net stack in the mist separator was increased to 500 mm.

The enriched and purified hydrogen peroxide solution obtained from the bottom of the fractionating distillation column contained 88 ppb by weight of sodium and 12 ppm by weight of evaporation residue giving only little improvement over the result of Comparative Example 3 even by increasing the height of the net stack in the mist separator.

What is claimed is:

1. In a method for the preparation of an enriched and purified aqueous hydrogen peroxide solution from a crude aqueous hydrogen peroxide solution comprising the steps of evaporating the crude aqueous hydrogen peroxide solution in an evaporator into vapor with accompanying liquid in the form of a mist, separating the vapor from the mist of liquid in a gas-liquid separator and subjecting the vapor to fractionating distillation in a fractionating distillation column, the improvement which comprises subjecting the crude aqueous hydrogen peroxide solution, prior to introduction into the evaporator, to a contacting treatment with a porous synthetic adsorbent resin to remove organic impurities from the crude aqueous hydrogen peroxide solution to such an extent that the crude aqueous hydrogen peroxide solution after the contacting treatment contains organic impurities in an amount not exceeding 50 ppm by weight calculated as organic carbon.

2. The improvement as claimed in claim 1 in which the contacting treatment of the crude aqueous hydrogen peroxide solution is performed by passing the solution through a column filled with the porous synthetic adsorbent resin.

3. The improvement as claimed in claim 1 in which the porous synthetic adsorbent resin is a crosslinked copolymeric resin of styrene and divinyl benzene.

4. The improvement as claimed in claim 1 in which the porous synthetic adsorbent resin is a crosslinked copolymeric resin of a halogenated styrene and divinyl benzene.

5. The improvement as claimed in claim 2 in which the crude aqueous hydrogen peroxide solution is passed through the column filled with the porous synthetic adsorbent resin at such a rate that the space velocity therein is in the range from 1 to 50 per hour.

6. The method according to claim 1, wherein the improvement further comprises using, as the gas-liquid separator, a cyclone of which the velocity of the vapor steam at the inlet thereto is in the range from 10 meters/second to 150 meters/second.

* * * * *